United States Patent
Li et al.

(10) Patent No.: US 10,662,262 B2
(45) Date of Patent: May 26, 2020

(54) OLEFIN POLYMERIZATION CATALYST SYSTEMS AND METHODS FOR MAKING THE SAME

(71) Applicant: ExxonMobil Chemical Patents Inc., Baytown, TX (US)

(72) Inventors: Dongming Li, Houston, TX (US); Ching-Tai Lue, Sugarland, TX (US); Phillip T. Matsunaga, Houston, TX (US); Mark B. Davis, Lake Jackson, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 207 days.

(21) Appl. No.: 15/804,554

(22) Filed: Nov. 6, 2017

(65) Prior Publication Data

US 2018/0155459 A1    Jun. 7, 2018

Related U.S. Application Data

(60) Provisional application No. 62/429,287, filed on Dec. 2, 2016.

(51) Int. Cl.
| | | |
|---|---|---|
| C08F 2/04 | (2006.01) | |
| C08F 4/14 | (2006.01) | |
| C08F 210/16 | (2006.01) | |
| C08F 4/659 | (2006.01) | |
| C08F 4/6592 | (2006.01) | |

(52) U.S. Cl.
CPC ............ *C08F 4/14* (2013.01); *C08F 4/65904* (2013.01); *C08F 4/65912* (2013.01); *C08F 210/16* (2013.01); *C08F 4/6592* (2013.01); *C08F 4/65908* (2013.01); *C08F 4/65916* (2013.01); *C08F 4/65925* (2013.01); *C08F 2410/01* (2013.01); *C08F 2420/02* (2013.01)

(58) Field of Classification Search
None
See application file for complete search history.

(56) References Cited

U.S. PATENT DOCUMENTS

| | | | | |
|---|---|---|---|---|
| 5,399,635 A | * | 3/1995 | Neithamer | ............... C07F 7/28 526/126 |
| 5,643,847 A | | 7/1997 | Walzer, Jr. | |
| 6,143,686 A | | 11/2000 | Vizzini et al. | |
| 6,228,795 B1 | | 5/2001 | Vizzini | |
| 6,368,999 B1 | | 4/2002 | Speca | |
| 6,417,298 B1 | * | 7/2002 | Ford | ...................... C08F 10/00 502/104 |
| 6,426,313 B2 | | 7/2002 | Walzer, Jr. et al. | |

FOREIGN PATENT DOCUMENTS

| | | |
|---|---|---|
| WO | 02/060957 A | 8/2002 |
| WO | 2015/191290 A | 12/2015 |
| WO | 2016/094843 A | 6/2016 |

* cited by examiner

*Primary Examiner* — Yun Qian
(74) *Attorney, Agent, or Firm* — ExxonMobil Chemical Patents, Inc—Law Department

(57) ABSTRACT

Borate activated catalyst systems and methods for making the same for gas phase or slurry phase olefin polymerization are provided. The catalyst system can include a first catalyst comprising a borate activated mono cyclopentadienyl metallocene compound and a second catalyst comprising a supported bis cyclopentadienyl metallocene complex. A supported bis cyclopentadienyl metallocene complex can be prepared to provide a preformed, supported catalyst, wherein the supported bis cyclopentadienyl metallocene complex comprises bis(1,3-methylbutyl cyclopentadienyl) zirconium dichloride. The preformed, supported catalyst can be mixed with mineral oil or hydrocarbon solvent to form a slurry. The slurry can be mixed with a borate activated mono cyclopentadienyl metallocene compound to form the borate activated catalyst system.

12 Claims, 1 Drawing Sheet

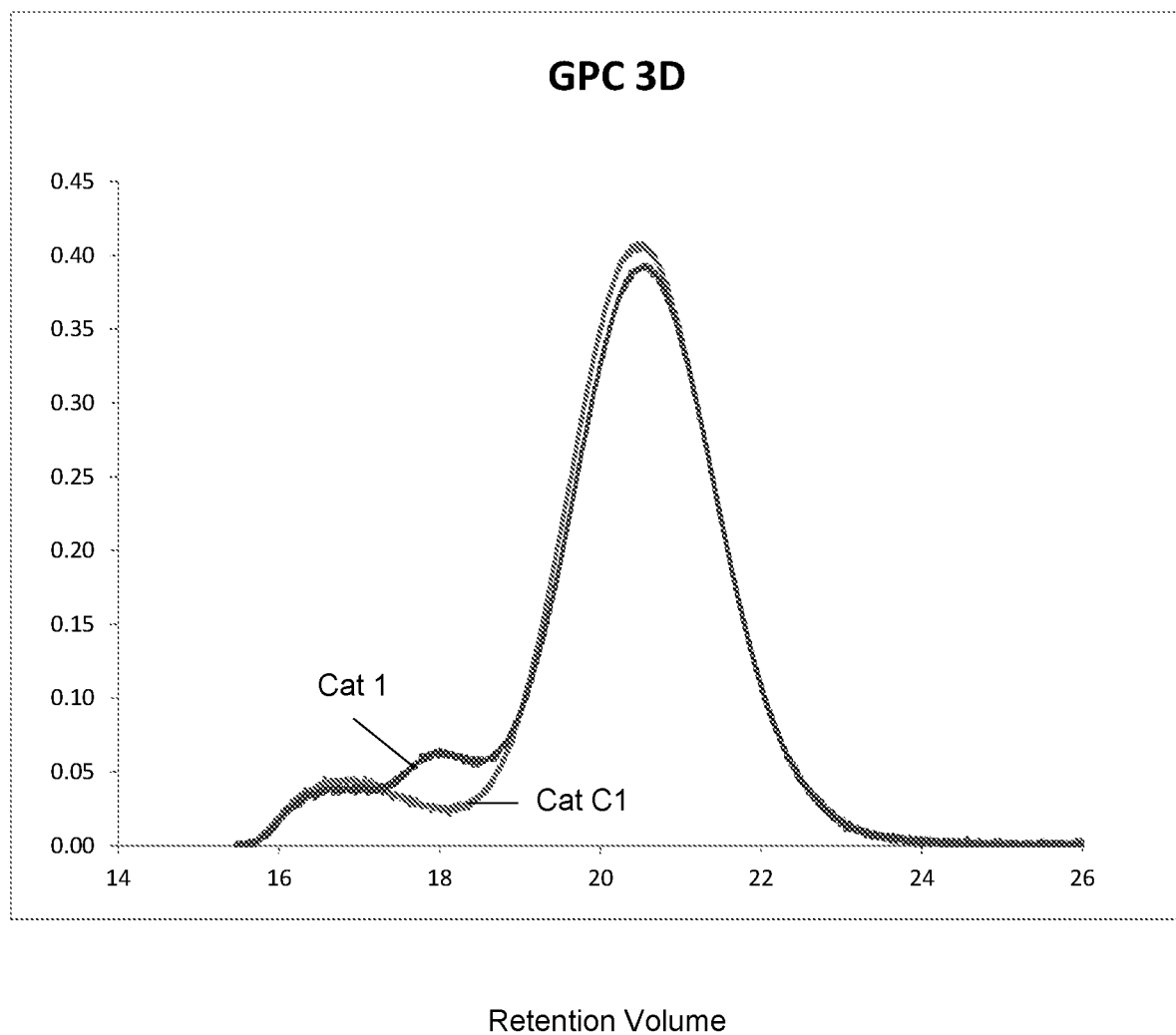

OLEFIN POLYMERIZATION CATALYST SYSTEMS AND METHODS FOR MAKING THE SAME

CROSS REFERENCE TO RELATED APPLICATIONS

This application claims the benefit of Ser. No. 62/429,287, filed Dec. 2, 2016, the disclosure of which is hereby incorporated by reference in its entirety.

FIELD OF THE INVENTION

The present disclosure generally relates to catalyst systems for olefin polymerization and methods for making the same.

BACKGROUND OF THE INVENTION

Borate activators have been used as alternatives to alumoxane activators for olefin polymerization catalyst systems for the production of polyolefin polymers. Some catalyst families, including metallocene catalyst families, exhibit better performance with borate activators than with alumoxane activators. Some of these improved performances are described in, for example, U.S. Pat. Nos. 5,643,847 and 6,143,686, which relate to binding borate activators onto silica. Improved performances from binding borate activators to synthesized polymer spheres or polymer beads are described in U.S. Pat. Nos. 6,426,313 and 6,228,795. Improvements from binding borate activators to fluorinated silicate supports are described in U.S. Pat. No. 6,368,999.

Borate activators are difficult, however, to implement in a supported catalyst system for a gas phase process. There is still a need, therefore, for new supported, borate activated catalyst complexes to be used in gas phase polymerization processes.

SUMMARY OF THE INVENTION

Borate activated catalyst systems for gas phase or slurry olefin polymerization, and methods for making the same are provided. In one or more embodiments, the catalyst system can include a first catalyst comprising a borate activated mono cyclopentadienyl metallocene compound, and a second catalyst comprising a supported bis cyclopentadienyl metallocene complex. A supported bis cyclopentadienyl metallocene complex can be prepared to provide a preformed, supported catalyst. The supported bis cyclopentadienyl metallocene complex can include bis(1,3-methylbutyl cyclopentadienyl) zirconium dichloride. The preformed, supported catalyst can be mixed with mineral oil or hydrocarbon solvent to form a slurry. The slurry can be mixed with a borate activated mono cyclopentadienyl metallocene compound to form the borate activated catalyst system. The borate activated mono cyclopentadienyl metallocene compound can be activated with tris (perfluorophenyl) borane and the mono cyclopentadienyl metallocene compound can be [(Me$_4$Cp)SiMe$_2$(NtBu)]TiMe$_2$.

BRIEF DESCRIPTION OF THE DRAWING

The FIGURE is a GPC trace of the polyethylene polymers referenced in Table 1 below.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It has been found that a borate activated catalyst complex can be incorporated into a second catalyst complex using simple preparation techniques to provide a catalyst system with good overall performance in polymerization processes, especially, in a gas phase polymerization process. The second catalyst can be a preformed supported catalyst or catalyst system. The terms "catalyst" and "catalyst system" are intended to be used interchangeably and refer to any one or more polymerization catalysts, activators, supports/carriers, additives, or combinations thereof. In many classes of embodiments, the resulting catalyst system is capable of producing polyethylene polymer films having significantly reduced haze and substantially similar mechanical properties to polyethylene polymer films made using the second catalyst or preformed supported catalyst system alone. In some cases, the haze of the resulting polyethylene polymer film can be reduced by as much as 50% compared to a polyethylene polymer film made with the preformed supported catalyst system alone, i.e., without the addition of a borate activated catalyst complex according to one or more embodiments described herein.

The term "polyethylene" and "polyethylene polymer" refer to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene polymer can thus be a homopolymer or a copolymer, including a terpolymer, having one or more other monomeric units. A polyethylene polymer described herein can, for example, include at least one or more other olefin(s) and/or comonomer(s). Suitable comonomers can contain 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene, mixtures thereof, and the like.

The borate activated catalyst complex can include one or more metallocene catalyst compounds activated with one or more borate activators. The metallocene catalyst compounds are preferably "half sandwich" compounds having one Cp ligand (cyclopentadienyl) bound to at least one Group 3 to Group 12 metal atom, and one or more leaving group(s) bound to the at least one metal atom. Such suitable metallocenes can include those "half sandwich" compounds described in U.S. Pat. Nos. 5,096,867; 5,057,475; 5,264,405; 5,621,126; 5,408,017; 7,163,907; and WO 1996/000244. In one specific embodiment, the metallocene catalyst compound is or includes [(Me$_4$Cp)SiMe$_2$(NtBu)]TiMe$_2$.

Suitable borate activators include one or more boron containing non-coordinating anions ("NCA"). The term NCA is defined to mean an anion either that does not coordinate to the catalyst metal cation or that does coordinate to the metal cation to a lesser extent than other metallocene activators such as methyl aluminoxane. For example, an NCA coordinates to the extent that a neutral Lewis base, such as an olefinically or acetylenically unsaturated monomer, can displace it from the catalyst active center.

Suitable borate activators include tris perfluorophenyl borane and tris perfluoronaphthyl borane. Other suitable borate activators can further include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C^6F^5)_{4-}]$; 1-(4-(tris(pentafluorophenyl)borate)-2,3,5,6-tetrafluorophenyl)pyrrolidinium; tetrakis(pentafluorophenyl)borate, 4-(tris(pentafluorophenyl)borate)-2,3,5,6-tetrafluoropyridine, and mixtures thereof. The boron containing NCAs can be used alone or in combination with alumoxane or modified alumoxane activators. Additional boron containing NCAs can be found in U.S. Publication No. 2016/0280722.

A useful activator-to-catalyst ratio is about a 1:1 molar ratio. Other ranges further include from 0.1:1 to 100:1, alternately, from 0.5:1 to 200:1, alternately, from 1:1 to 500:1, alternately, from 1:1 to 1000:1. A particularly useful range is from 0.5:1 to 10:1, preferably 1:1 to 5:1.

The second catalyst preformed supported catalyst system can include any one or more catalyst systems or complexes described in U.S. Pat. No. 6,090,740. In a specific embodiment, the second or preformed supported catalyst system is or includes bis(1,3-methylbutyl cyclopentadienyl) zirconium dichloride that has been activated with MAO (methyl alumoxane or methyl aluminoxane) and supported on silica. This particular catalyst system is commercially available from Univation Technologies, LLC, Houston, Tex.

Preparation of Mixed Catalyst System

The catalyst compounds and complexes described above may be combined to form a mixed catalyst system. The two or more catalyst compounds can be added together in a desired ratio, contacted with an activator, contacted with a support, or a supported activator. The catalyst compounds may be added to the mixture sequentially or at the same time.

In some embodiments, more complex procedures are possible, such as addition of a first catalyst compound to a slurry including a support or a supported activator mixture for a specified reaction time, followed by the addition of the second catalyst compound solution, mixed for another specified time x, after which the mixture may be recovered for use in a polymerization reactor, such as by spray drying.

In some embodiments, the first catalyst compound may be supported via contact with a support material for a reaction time, and isolated to provide a preformed, supported catalyst. The resulting preformed, supported catalyst composition may then be mixed with mineral oil or hydrocarbon solvent to form a slurry, which may or may not include an activator. The slurry may then be admixed with a second catalyst compound prior to introduction of the resulting mixed catalyst system to a polymerization reactor. The catalyst compounds may be admixed at any point prior to introduction to the reactor, such as in a polymerization feed vessel or in-line in a catalyst delivery system.

Any suitable hydrocarbon solvent can be used. Both aliphatic and aromatic solvents are suitable. Alkanes, such as $C_5$-$C_{14}$ alkanes and mixtures thereof, are suitable. Non-limiting examples include hexane, pentane, isopentane, neopentane, octane, and mixtures thereof. Aromatic solvents are also useful and include but are not limited to toluene.

The borate activated catalyst complex can be about 0.5 wt % to about 1.0 wt % of the total weight of the catalyst system. The borate activated catalyst complex also can be about 0.6 wt % to about 1.0 wt % of the total weight of the catalyst system. The weight content of the borate activated catalyst complex in the catalyst system also can range from a low of about 0.5 wt %, 0.55 wt %, or 0.6 wt % to a high of about 0.7 wt %, 0.8 wt %, or 1.0 wt %, based on the total weight of the catalyst system.

Polymerization Process

Polymerization processes include solution, gas phase, slurry phase and a high pressure process or a combination thereof. Particularly preferred is a gas phase or slurry phase polymerization of one or more olefin(s) at least one of which is ethylene or propylene.

In any embodiment, the process of the invention may be directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1, decene-1, and mixtures thereof.

Other monomers useful in the process of the invention include ethylenically unsaturated monomers, diolefins having 4 to 18 carbon atoms, conjugated or nonconjugated dienes, polyenes, vinyl monomers, and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene, cyclopentene, and mixtures thereof.

For gas phase polymerization, in very general terms, a conventional fluidized bed polymerization process for producing polyethylene polymers and other types of polymers is conducted by passing a gaseous stream containing ethylene and one or more comonomers continuously through a fluidized bed reactor under reactive conditions and in the presence of one or more catalysts at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous (co)monomer, is continuously withdrawn from the reactor, compressed, cooled and recycled into the reactor. Product is withdrawn from the reactor and make-up (co) monomer is added to the system, e.g., into the recycle stream or reactor, to replace the polymerized monomer.

An industrial-scale reactor that may be utilized is capable of producing greater than 227 kg of polymer per hour (kg/hr) to about 90,900 kg/hr or higher of polymer. The reactor may be capable of producing greater than 455 kg/hr, or greater than 4540 kg/hr, or greater than 11,300 kg/hr, or greater than 15,900 kg/hr, or greater than 22,700 kg/hr, or greater than 29,000 kg/hr, or greater than 45,500 kg/hr. Such reactors, for example, can have an inner diameter of at least about 6 inches in the region where the fluid bed resides, and is generally greater than about 8 feet on the industrial-scale, and can exceed 15, 17, or 20 feet.

The reactor pressure can vary from about 100 psig (690 kPa) to about 600 psig (4138 kPa), preferably, in the range of from about 200 psig (1379 kPa) to about 400 psig (2759 kPa), and more preferably, in the range of from about 250 psig (1724 kPa) to about 350 psig (2414 kPa).

The reactor temperature can vary from about 30° C. to about 140° C. In one approach, the reactor temperature can be less than about 40° C., less than about 30° C., more preferably less than about 20° C., and even more preferably less than about 15° C. below the melting point of the polymer being produced. Polyethylene, for example, has a melting point in the range of approximately 125° C. to 130° C.

The gas phase process can be operated in a condensed mode, where an inert condensable fluid or agent is introduced to the process to increase the cooling capacity of the reactor system. These inert condensable fluids are often referred to as induced condensing agents or ICA's. Condensed mode processes are further described in U.S. Pat. Nos. 5,342,749 and 5,436,304.

Additional processing details are more fully described in, for example, U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,804,678; 6,362,290; and 6,689,847.

Polymer and Film Properties

The polyethylene polymer can have a "melt flow ratio" or "melt index ratio" ($I_{21}/I_2$) ranging from about 5 to about 300, more preferably from about 10 to less than about 250, and from about 15 to about 200. $I_{21.6}$ is the "flow index" or melt flow rate of the polymer measured according to ASTM D-1238-57T, condition F (190° C., 21.6 kg), and $I_{2.16}$ is the "melt index" or melt flow rate of the polymer measured according to ASTM D-1238-57T, condition E (190° C./2.16 kg). The ratio of $I_{21.6}$ to $I_{2.16}$ is the "melt flow ratio" or "MFR" or sometimes referred to as "melt index ratio" or "MIR". The melt flow rate $I_{21.6}$ is also sometimes termed the "high load melt index" or "HLMI". Melt flow rates are reported in units of grams per 10 minutes (g/10 min) or equivalently decigrams per minute (dg/min).

Density can be determined in accordance with ASTM D-792. Density is expressed as grams per cubic centimeter (g/cm$^3$) unless otherwise noted. The polyethylene polymer can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. The polyethylene can have a bulk density, measured in accordance with ASTM-D-1238, of from about 0.25 g/cm$^3$ to about 0.5 g/cm$^3$. For example, the bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

Gel Permeation Chromatography (GPC) with three detectors (GPC-3D) can be determined using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 23° C. temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc).$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'vis = \frac{[\eta]_{avg}}{kM_v^\alpha},$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $Mi^2$.

Haze and clarity can be measured in accordance with ASTM D-1003. The polyethylene polymer films can have a haze of less than 15%. In more preferred embodiments, the haze is less than 10% and even less than 9%.

Elmendorf Tear in the machine and transverse direction is tested using an Elmendorf Tearing Tester based upon ASTM D 1922-15 method.

Dart Drop Impact Strength can be measured by the Free-Falling Dart method (ASTM D1709-15a, Method B, stainless steel). The test is conducted at 23° C., 50% relative humidity after conditioning the samples at 40+ hrs @23° C. and 50% relative humidity. For the test, the impact failure weight (F50, grams), the weight at which 50% failure and 50% pass occurs is reported. F=0 or F0 is defined as the maximum drop weight possible on the instrument at which the samples reported all 10 pass (with 0 failure).

End Uses

The polyethylene can be suitable for such articles as films, fibers and nonwoven fabrics, extruded articles, and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, in food-contact and non-food contact applications, agricultural films, and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers, toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

In the examples that follow, a borate activated catalyst, the product of tris perfluorophenyl borane and $[(Me_4Cp)SiMe_2(NtBu)]TiMe_2$, was added to a second catalyst that was a supported bis cyclopentadienyl metallocene catalyst marketed as XCAT™ HP-100 catalyst (commercially available from Univation Technologies, LLC) to prepare two mixed catalyst systems (Cat 1 and Cat 2). The borate activated catalyst complex was about 0.64 wt % of the total weight of the total catalyst system. The two mixed catalyst systems (Cat 1 and Cat 2) were tested in two pilot scale gas phase reactor systems to produce polyethylene polymers (resin #1 and resin #2) having a MI ($I_{21}$) of about 1.0 g/10 min and a density of about 0.918 g/cm³.

The second catalyst used in the examples was a preformed catalyst system made of bis(1,3-methylbutyl cyclopentadienyl) zirconium dichloride with methyl aluminoxane on silica. A more detailed description of this metallocene catalyst system can be found in U.S. Pat. No. 6,090,740.

Preparation of Catalyst 1:

Solid $Me_4CpLi$ (10.0 g, 78 mmol) was added slowly to a solution of $Me_2SiCl_2$ (11.5 mL, 95 mmol) in THF (250 mL). The solution was stirred at about 23° C. for 1 hr and then the THF was removed under reduced pressure. The reaction residue was extracted with pentane and filtered. Removal of the pentane under reduced pressure produced $Me_4CpSiMe_2Cl$ as a yellow liquid. The $Me_4CpSiMe_2Cl$ (10.0 g, 47 mmol) was added slowly to a solution of tBuNHLi (3.68 g, 47 mmol) in THF (125 mL) resulting in an orange-brown solution. The solution was stirred at ambient temperature overnight and the THF was removed under reduced pressure. The reaction residue was extracted with diethyl ether (100 mL) and filtered. The diethyl ether was removed under reduced pressure producing $Me_4CpSiMe_2NHtBu$ as an orange-brown liquid. The $Me_4CpSiMe_2NHtBu$ was dissolved in diethyl ether (200 mL) and a solution of BuLi (8.8 mL of 10 M BuLi in diethyl ether diluted to a total volume of 20 mL with diethyl ether) was added. An off-white precipitate formed and the slurry was stirred at about 23° C. for 1 hr. The solid was isolated by filtration and the residual solvent was removed under reduced pressure producing $[Me_4CpSiMe_2NtBu]Li_2$.

To a solution of $[Me_4CpSiMe_2NtBu]Li_2$ (8.75 g, 33.2 mmol) in diethyl ether was added $TiCl_4 \cdot 2Et_2O$ (11.1 g, 33.2 mmol) at −25° C. The mixture was warmed to about 23° C. and stirred for about 12 hours. The solvent was removed under reduced pressure and the reaction residue was extracted with $CH_2Cl_2$ (200 mL) and filtered.

The product was precipitated with pentane and then recrystallized from $CH_2Cl_2$/pentane to produce $[(Me_4Cp)SiMe_2(NtBu)]TiCl_2$. To a solution of $[(Me_4Cp)SiMe_2(NtBu)]TiCl_2$ (2.05 g, 5.6 mmol) in diethyl ether (125 mL) was added 8.0 mL of a 1.4 M solution of MeLi in diethyl ether dropwise with stirring. The green solution was stirred for about 12 hours and the solvent was removed under reduced pressure. The reaction residue was extracted with pentane and filtered. The filtrate was concentrated and cooled to produce $[(Me_4Cp)SiMe_2(NtBu)]TiMe_2$ as a crystalline solid.

A solution of $(C_6F_5)_3B$ (0.119 g, 0.232 mmol) in toluene (5 mL) was added dropwise to a solution of $[(Me_4Cp)SiMe_2(NtBu)]TiMe_2$ (0.076 g, 0.232 mmol) in toluene (5 mL) and the resulting yellow-orange solution was stirred at about 23° C. for 1 hr. Toluene (50 mL) was used to wash any solids on the flask walls into the slurry. The yellow-orange catalyst solution was added dropwise to the preformed catalyst slurry and the mixture was stirred at about 23° C. for about 12 hours. The solid catalyst was collected by filtration and residual solvent was removed under reduced pressure. The catalyst was isolated as a free-flowing, yellow powder with a yield of 29.5 g.

Preparation of Catalyst 2

The catalyst was prepared as described for Catalyst 1, but at a 10× scale and using 900 mL of toluene to form a slurry of the preformed catalyst. The mixed catalyst slurry was stirred for 4 hrs before collecting the solid and removing residual solvent under reduced pressure. The catalyst was isolated as a free-flowing yellow powder.

Example 1

A test using Catalyst 1 was carried out in a fluidized bed reactor equipped with devices for temperature control, catalyst feeding or injection equipment, GC analyzer for monitoring and controlling monomer and gas feeds and equipment for polymer sampling and collecting. The reactor had a 6 inch (15.24 cm) diameter bed section increasing to 10 inches (25.4 cm) at the reactor top. Gas went in through a perforated distributor plate allowing fluidization of the bed contents and polymer sample was discharged at the reactor top. Polymerization conditions and resin properties are shown below in Table 1.

TABLE 1

Resin #1 polymerization conditions and physical properties

| Polymerization conditions and physical properties | Cat 1 | Preformed Catalyst (Cat C1) |
|---|---|---|
| Hydrogen Conc., ppmv | 92 | 105 |
| Hexene conc., mol % | 0.71 | 0.66 |
| Ethylene conc., mol % | 34.9 | 35.1 |
| Reactor pressure, psig | 300 | 300 |
| Reactor temperature, ° C. | 79 | 79 |
| Production rate, g/hr | 393 | 352 |
| Residence time, hr | 4.7 | 5.3 |
| Melt index | 1.1 | 1.1 |
| Density | 0.918 | 0.917 |

Example 2

A second test using the Catalyst #2 was in a continuous pilot-scale gas phase fluidized bed reactor of 14 inches internal diameter and about 4.6 to about 5.2 feet in bed height was used. The fluidized bed was made up of polymer granules. The gaseous feed streams of ethylene and hydrogen together with liquid hexene were introduced below the reactor bed into the recycle gas line. The individual flow rates of ethylene, hydrogen, and hexene were controlled to maintain fixed composition targets. The ethylene concentration was controlled to maintain a constant ethylene partial pressure of about 220 psia. The hydrogen was controlled to maintain a constant hydrogen to ethylene mole ratio. Hexene was controlled to maintain a constant hexene to ethylene mole ratio of about 0.0007. The concentrations of all the gases were measured by an on-line gas chromatograph to ensure relatively constant composition in the recycle gas stream.

Catalyst #2 was injected directly into the fluidized bed using purified nitrogen as a carrier. Its rate was adjusted to maintain a constant production rate. The reacting bed of growing polymer particles was maintained in a fluidized state by the continuous flow of the make-up feed and recycle gas through the reaction zone. Superficial gas velocities of 1.9 to about 2.4 feet/sec was used to achieve this. The reactor was operated at a total pressure of about 349 psig. The reactor was operated at various reaction temperatures of 85-105° C.

The fluidized bed was maintained at a constant height (about 4.6 to about 5.2 feet) by withdrawing a portion of the bed at a rate equal to the rate of formation of particulate product. The rate of product formation (the polymer production rate) was in the range of about 21.2 to about 49.4 lb/hr. The product was removed semi-continuously via a series of valves into a fixed volume chamber. Table 2 summarizes the polymerization conditions and resin properties.

TABLE 2

Resin #2 polymerization conditions and physical properties

| Catalyst | Cat 2 | Cat 2 | Cat 2 | Preformed Catalyst |
|---|---|---|---|---|
| Ethylene pressure, psia | 220 | 220 | 220 | 220 |
| Reactor temperature, ° C. | 85 | 79 | 79 | 85 |
| Residence time, hr | 3.0 | 3.0 | 4.2 | 2.9 |
| Melt index | 1.04 | 1.15 | 1.15 | 1.03 |
| Density | 0.92 | — | — | 0.919 |
| MFR | 15.5 | 15.3 | 15.8 | 14.8 |
| Film gauge, mil | 1.04 | 1.08 | 1.02 | 1.07 |
| Clarity, % | 99.0 | 98.0 | 97.9 | 96.5 |
| Haze, % | 9.3 | 13.9 | 12.9 | 18.2 |
| Elmendorf tear - MD, g/mil | 248 | 227 | 221 | 255 |
| Elmendorf tear - TD, g/mil | 432 | 557 | 457 | 393 |
| Dart drop, g/mil | 329 | 697 | 665 | 538 |
| Puncture energy at break, in-lb/mil | 36.1 | 38.0 | 35.8 | 37.1 |

Catalyst operability was excellent and substantially similar to that of the preformed catalyst alone. Analysis of resin #1 indicated the presence of long chain branching (LCB), which is consistent with product produced by the Ti catalyst component. Referring to the FIGURE, the GPC 3D data, however, showed the presence of a new HMW population, which is not typical of a Ti catalyst component. A film study using resin #2 demonstrated a significant improvement in total haze compared to a film sample (Comp #1) derived from the standard catalyst without the Ti component (9.3% vs. 18.2%).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc., are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization catalyst system comprising the product of: a first catalyst comprising the product of a borate activator and mono cyclopentadienyl metallocene compound; and a second catalyst comprising a supported bis cyclopentadienyl metallocene complex, wherein:
    (a) the borate activator comprises tris perfluorophenyl borane;
    (b) the mono cyclopentadienyl metallocene compound comprises (tert-butylamido)dimethyl(tetramethyl-$n^5$-cyclopentradinyl)silanedimethyl titanium) (($Me_4C_p$)$SiMe_2$(N-tert-Bu)$TiMe_2$;
    (c) the supported bis cyclopentadienyl metallocene complex comprises bis(1,3-methylbutl cyclopentadienyl) zirconium dichloride; and
    (d) the first catalyst is 0.5 wt % to 1 wt % of the total weight of the catalyst system.

2. The catalyst system of claim 1, wherein the supported bis cyclopentadienyl metallocene complex is activated with methyl alumoxane.

3. The catalyst system of claim 1, wherein the supported bis cyclopentadienyl metallocene complex is supported on silica.

4. The catalyst system of claim 1, wherein the first catalyst is 0.5 wt % to 0.7 wt % of the total weight of the catalyst system.

5. A method for making a catalyst system of claim 1 for gas phase or slurry olefin polymerization, comprising:
    (a) preparing a supported bis cyclopentadienyl metallocene complex to provide a preformed, supported catalyst;
    (b) mixing the preformed, supported catalyst in mineral oil or hydrocarbon solvent to form a slurry; and
    (c) mixing the slurry with a borate activated mono cyclopentadienyl metallocene compound to form the catalyst system.

6. The method of claim 5, wherein the borate activated mono cyclopentadienyl metallocene compound is 0.5 wt % to 1 wt % of the total weight of the catalyst system.

7. The method of claim 5, wherein the borate activated mono cyclopentadienyl metallocene compound is activated with tris (perfluorophenyl) borane.

8. The method of claim 5, wherein the mono cyclopentadienyl metallocene compound is [($Me_4C_p$)$SiMe_2$(N-tert-Bu)]$TiMe_2$.

9. The method of claim 5, wherein the supported bis cyclopentadienyl metallocene complex comprises bis(1,3-methylbutyl cyclopentadienyl) zirconium dichloride.

10. The method of claim 5, wherein the supported bis cyclopentadienyl metallocene complex is activated with methyl alumoxane.

11. The method of claim 5, wherein the supported bis cyclopentadienyl metallocene complex is supported on silica.

12. The method of claim 5, wherein:
    (a) the borate activated mono cyclopentadienyl metallocene compound is activated with tris (perfluorophenyl) borane;
    (b) the mono cyclopentadienyl metallocene compound comprises [($Me_4Cp$)$SiMe_2$(N-tert-Bu)$TiMe_2$;
    (c) the supported bis cyclopentadienyl metallocene complex comprises bis(1,3-methylbutyl cyclopentadienyl) zirconium dichloride; and
    (d) the borate activated mono cyclopentadienyl metallocene compound is 0.5 wt % to 1 wt % of the total weight of the catalyst system.

* * * * *